United States Patent
Kang et al.

(10) Patent No.: US 8,626,181 B2
(45) Date of Patent: Jan. 7, 2014

(54) APPARATUS AND METHOD FOR ALLOCATING A DEDICATED ACCESS ZONE TO RELAY STATION (RS) IN BROADBAND WIRELESS ACCESS (BWA) COMMUNICATION SYSTEM

(75) Inventors: Hyun-Jeong Kang, Seoul (KR); Chang-Yoon Oh, Yongin-si (KR); Jung-Je Son, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 12/203,320

(22) Filed: Sep. 3, 2008

(65) Prior Publication Data

US 2009/0068944 A1   Mar. 12, 2009

(30) Foreign Application Priority Data

Sep. 7, 2007  (KR) .................. 10-2007-0090988
Jan. 18, 2008  (KR) .................. 10-2008-0005490

(51) Int. Cl.
*H04W 72/00*  (2009.01)

(52) U.S. Cl.
USPC ......... 455/452.2; 455/7; 455/450; 455/452.1; 455/509; 370/315

(58) Field of Classification Search
USPC ............ 455/7–11.1, 14–25, 450, 452.1, 509; 370/315

See application file for complete search history.

(56) References Cited

U.S. PATENT DOCUMENTS

| | | | |
|---|---|---|---|
| 6,618,365 B1 * | 9/2003 | Vannatta et al. | 370/333 |
| 7,894,388 B2 * | 2/2011 | Visotsky | 370/329 |
| 7,916,704 B2 * | 3/2011 | Ramachandran et al. | 370/338 |
| 2007/0097945 A1 * | 5/2007 | Wang et al. | 370/349 |
| 2007/0153746 A1 * | 7/2007 | Lee et al. | 370/335 |
| 2008/0227461 A1 * | 9/2008 | Dayal et al. | 455/452.2 |

* cited by examiner

*Primary Examiner* — Raymond Dean
(74) *Attorney, Agent, or Firm* — Jefferson IP Law, LLP (57) ABSTRACT

An apparatus and a method for allocating a dedicated access zone to a Relay Station (RS) in a multihop relay Broadband Wireless Access (BWA) communication system are provided. A communicating method of the RS includes relaying communications between a Base Station (BS) and a Mobile Station (MS), determining whether a dedicated resource is necessary for the communications with the MS, when the dedicated resource is necessary, generating a dedicated access zone request message which comprises necessary bandwidth information and transmitting the dedicated access zone request message to the BS.

27 Claims, 8 Drawing Sheets

APPARATUS AND METHOD FOR ALLOCATING A DEDICATED ACCESS ZONE TO RELAY STATION (RS) IN BROADBAND WIRELESS ACCESS (BWA) COMMUNICATION SYSTEM

PRIORITY

This application claims the benefit under 35 U.S.C. §119 (a) of a Korean patent application filed in the Korean Intellectual Property Office on Sep. 7, 2007 and assigned Serial No. 2007-90988 and of a Korean patent application filed in the Korean Intellectual Property Office on Jan. 18, 2008 and assigned Serial No. 2008-5490, the entire disclosures of both of which are hereby incorporated by reference.

BACKGROUND OF THE INVENTION

1. Field of the Invention

The present invention relates to a Broadband Wireless Access (BWA) communication system adopting a multihop relay scheme. More particularly, the present invention relates to an apparatus and a method for allocating a dedicated access zone to a Relay Station (RS) which performs a distributed scheduling to communicate with a Mobile Station (MS).

2. Description of the Related Art

A fourth generation (4G) communication system, which is a next-generation communication system, aims to provide users with services of various Quality of Service (QoS) levels at a data rate of about 100 Mbps. Particularly, present-day 4G communication systems are advancing in order to guarantee mobility and QoS in Broadband Wireless Access (BWA) communication systems such as Local Area Network (LAN) systems and Metropolitan Area Network (MAN) systems. Representative examples include an Institute of Electrical and Electronics Engineers (IEEE) 802.16d communication system and an IEEE 802.16e communication system.

Both the IEEE 802.16d communication system and the IEEE 802.16e communication system adopt Orthogonal Frequency Division Multiplexing (OFDM)/Orthogonal Frequency Division Multiple Access (OFDMA) schemes for physical channels. The IEEE 802.16d communication system considers only the fixed status of a current Subscriber Station (SS), that is, takes into account only a single-cell structure without considering the mobility of the SS. In comparison to the IEEE 802.16d communication system, the IEEE 802.16e communication system considers the mobility of the terminal. A mobile terminal is referred to herein as a Mobile Station (MS).

Figure 1:
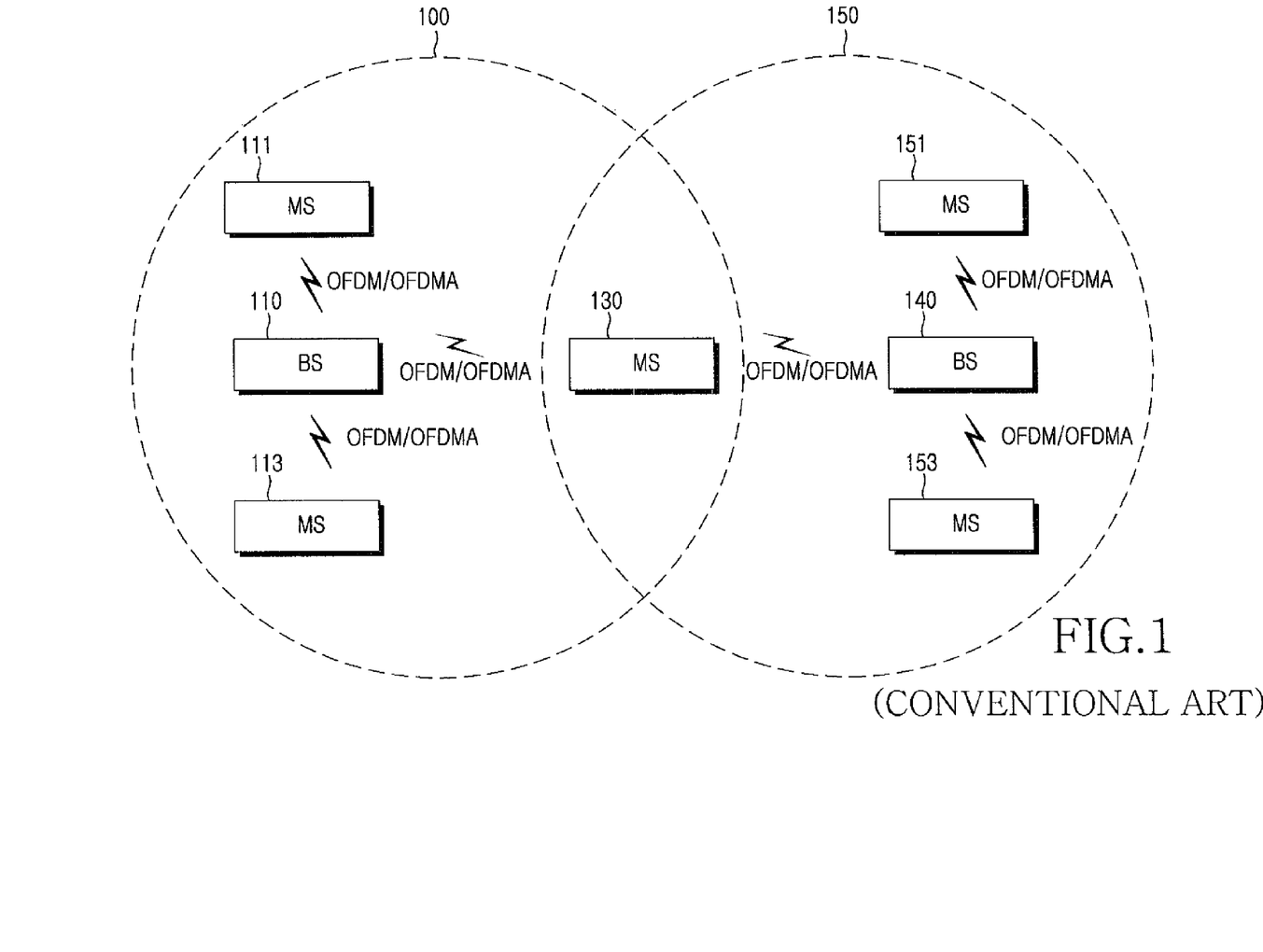
FIG. 1 illustrates a simplified structure of a conventional IEEE 802.16e communication system.

FIG. 1 illustrates a simplified structure of a conventional IEEE 802.16e communication system.

The IEEE 802.16e communication system has a multi-cell structure. For example, the IEEE 802.16e communication system may include a cell 100 and a cell 150. The IEEE 802.16e communication system includes a Base Station (BS) 110 which manages the cell 100, a BS 140 which manages the cell 150, and MSs 111, 113, 130, 151, and 153 which are each located in one or more cells of the system. Between the BSs 110 and 140 and the MSs 111, 113, 130, 151 and 153, signals are transmitted and received according to the OFDM/OFDMA scheme. Of the MSs 111, 113, 130, 151 and 153, the MS 130 travels within a boundary between the cell 100 and the cell 150. Such a boundary area between the cells is considered a handover area. For example, when the MS 130 moves into the cell 150, managed by the BS 140, while transmitting and receiving signals with the BS 110, its serving BS is changed or handed over from the BS 110 to the BS 140.

Since the signaling is conducted between the fixed BS and the MS using a direct link as shown in FIG. 1, the IEEE 802.16e communication system can easily establish a radio communication link of high reliability between the BS and the MS. However, because of the fixed BS, the IEEE 802.16e communication system has low flexibility regarding its wireless network configuration. Thus, in a radio environment that undergoes several changes of traffic distribution or traffic requirements, it is difficult for the IEEE 802.16e communication system to provide an efficient communication service.

To address these shortcomings, a multihop relay data transmission schemed can be applied to a wireless cellular communication system such as an IEEE 802.16e communication system by using a stationary or mobile Relay Station (RS) or the general MSs. The multihop relay wireless communication system can be used to reconfigure a network in order to promptly handle a communication environment change and therefore operate the entire radio network more efficiently. In addition, the multihop relay wireless communication system can expand the cell service coverage and increase the system capacity. For example, if there is a poor channel condition between the BS and the MS, the multihop relay wireless communication system can establish a multihop relay path via an RS by installing the RS between the BS and the MS, to thus provide the MS with a better radio channel. Also, in a cell boundary in which signal conditions from the BS are weak and subject to greater interference, the multihop relay scheme can provide a high-speed data channel and expand the cell service coverage area.

Now, a structure of a conventional multihop relay wireless communication system that provides expansion of the service coverage area of a BS is illustrated.

Figure 2:
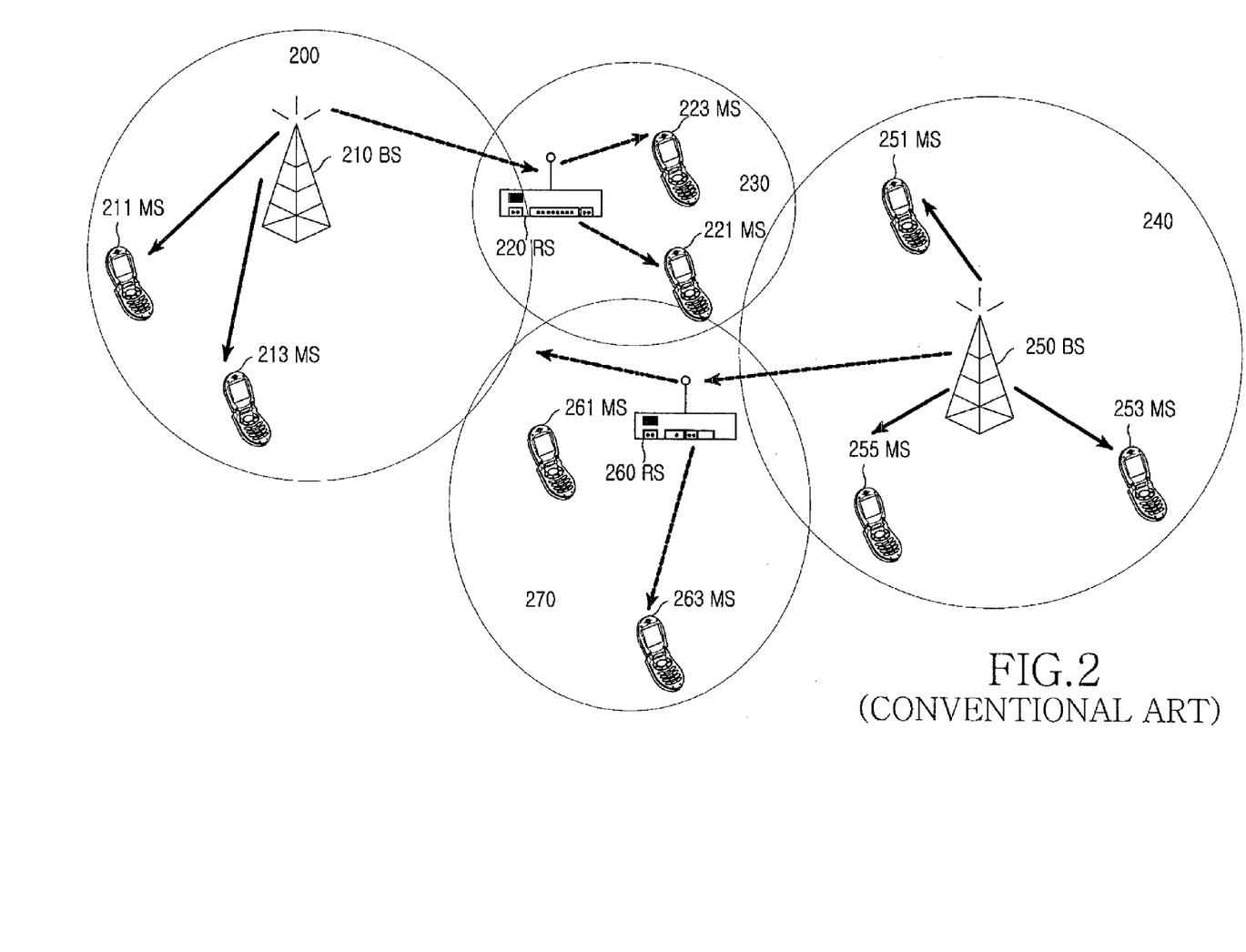
FIG. 2 illustrates a simplified structure of a conventional multihop relay broadband wireless communication system for a service coverage area extension of a Base Station (BS)

FIG. 2 depicts a simplified structure of a multihop relay broadband wireless communication system for the service coverage expansion of the BS.

The multihop relay wireless communication system of FIG. 2 has a multi-cell structure. That is, the multihop relay wireless communication system includes a cell 200 and a cell 240. The multihop relay wireless communication system includes a BS 210 which manages the cell 200 and a BS 250 which manages the cell 240. The multihop relay wireless communication system also includes MSs 211 and 213 in the coverage area of the cell 200, MSs 221 and 223 managed by the BS 210 but out of the coverage area of the cell 200, and an RS 220 which provides multihop relay paths between the BS 210 and the MSs 221 and 223 in a coverage area 230. The multihop relay wireless communication system further includes MSs 251, 253 and 255 in the coverage area of the cell 240, MSs 261 and 263 managed by the BS 250 but out of the coverage area of the cell 240, and an RS 260 which provides multihop relay paths between the BS 250 and the MSs 261 and 263 in a coverage area 270. Between the BSs 210 and 250, the RSs 220 and 260, and the MSs 211, 213, 221, 223, 251, 253, 255, 261 and 263, signals are transmitted and received using the OFDM/OFDMA scheme.

Next, a structure of a multihop relay wireless communication system for increasing system capacity is described.

Figure 3:
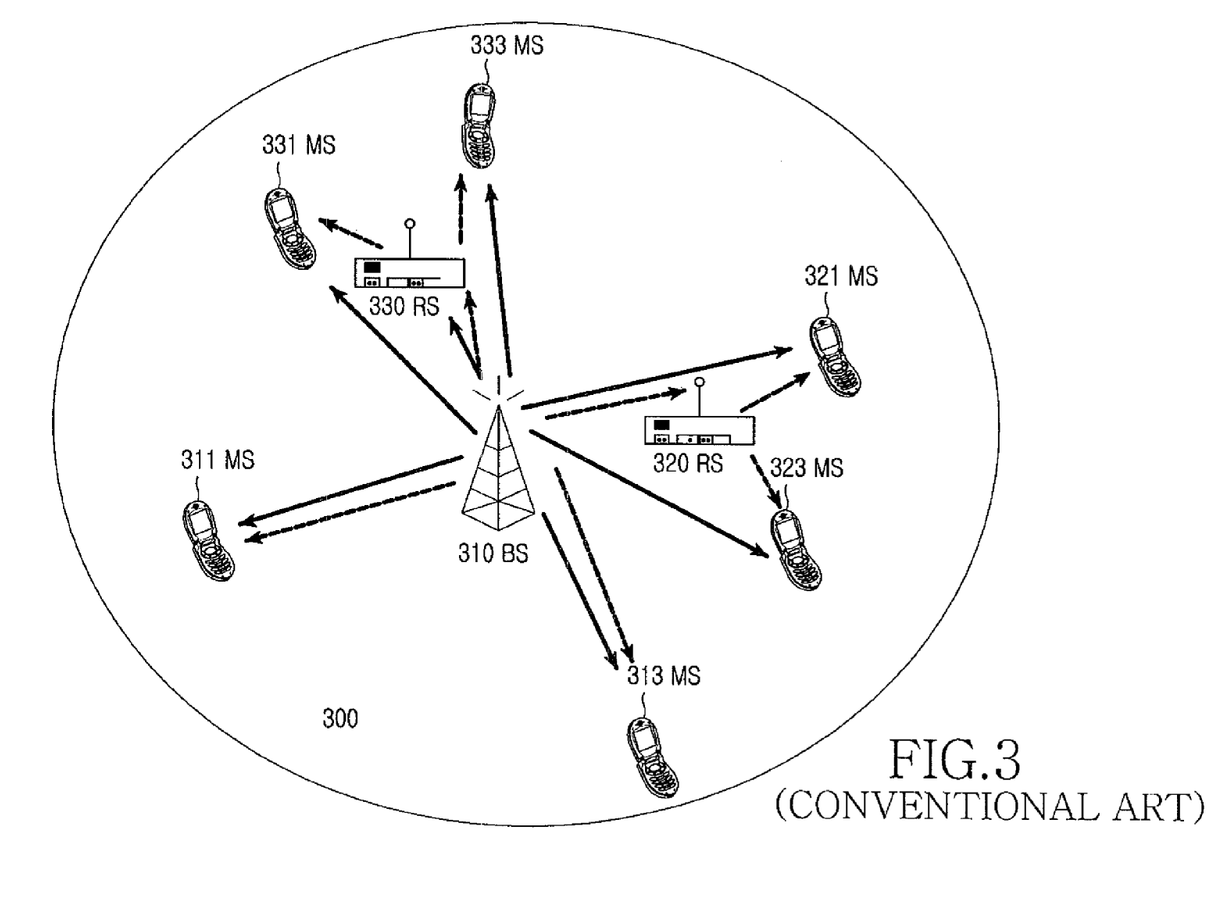
FIG. 3 illustrates a simplified structure of a conventional multihop relay broadband wireless communication system for a system capacity increase.

FIG. 3 illustrates a simplified structure of a conventional multihop relay broadband wireless communication system for increasing system capacity.

The multihop relay wireless communication system of FIG. 3 includes a BS 310 and MSs 311, 313, 321, 323, 331 and 333 located within a cell 300 that are managed by the BS 310. The multihop relay wireless communication system also includes RSs 320 and 330 which provide multihop relay paths between the BS 310 and the MSs 311, 313, 321, 323, 331 and 333. Between the BS 310, the RSs 320 and 330, and the MSs 311, 313, 321, 323, 331 and 333, signals are transmitted and received using the OFDM/OFDMA scheme. The MSs 311, 313, 321, 323, 331 and 333 and the RSs 320 and 333 within the coverage of the cell 300 can transmit and receive signals directly to and from the BS 310.

However, some MSs, such as MSs 321, 323, 331 and 333 near the boundary of the cell 300, are subject to a low Signal to Noise Ratio (SNR) of direct links between the BS 310 and the MSs 321, 323, 331 and 333. The RSs 320 and 330 can increase the effective transfer rate of the MSs and increase the system capacity by providing high-speed data transmission paths to the MSs 321, 323, 331 and 333.

In the multihop relay broadband wireless communication system of FIG. 2 or FIG. 3, the RSs 220, 260, 320 and 330 can be infrastructure RSs installed by a service provider and managed by the BSs 210, 250 and 310 which are aware of the existence of the RSs in advance, or client RSs which serve as SSs (or MSs) or RSs in some cases. The RSs 220, 260, 320, and 330 can be stationary, nomadic (e.g., notebook computer), or mobile like the MS.

The BS in the multihop relay system can schedule the communications with its managing RS and the communications between the RS and the MS. When the BS schedules both the relay link between the BS and the RS as well as the access link between the RS and the MS, the scheduling is referred to as centralized scheduling. In contrast, when the RS directly schedules its MSs without intervention of the BS, the scheduling is referred to as a distributed scheduling.

In the distributed scheduling, the RS may want to communicate with an MS using a dedicated resource. For instance, if a channel between the RS and the MS suffers significant interference from a neighbor node, the RS may want to communicate using a dedicated resource. In this situation, the BS needs to schedule the dedicated resource. More specifically, the RS needs to request a dedicated region from the BS for its own private use, and the BS needs to determine a region corresponding to the RS's request and inform the RS of the determined region. That is, even in the distributed scheduling, the BS needs to schedule an access link (or an access zone) through which the RS and the MS may communicate. Accordingly, there is needed a signaling method for the BS to allocate a Relay (R)-access region to the RS.

SUMMARY OF THE INVENTION

An aspect of the present invention is to address at least the above mentioned problems and/or disadvantages and to provide at least the advantages described below. Accordingly, an aspect of the present invention is to provide an apparatus and a method for allocating a dedicated access region to a Relay Station (RS) which performs a distributed scheduling to communicate with a Mobile Station (MS) in a multihop relay wireless communication system.

Another aspect of the present invention is to provide an apparatus and a method for informing an RS which performs a distributed scheduling of forbidden region information in a multihop relay wireless communication system.

Yet another aspect of the present invention is to provide a signaling apparatus and a method for allocating a dedicated access resource to an RS which performs a distributed scheduling to communicate with an MS in a multihop relay wireless communication system.

In accordance with an aspect of the present invention, a communicating method of an RS in a multihop relay wireless communication system is provided. The method includes relaying communications between a Base Station (BS) and an MS, determining whether a dedicated resource is necessary for the communications with the MS, when the dedicated resource is necessary, generating a dedicated access zone request message which comprises necessary bandwidth information and transmitting the dedicated access zone request message to the BS.

In accordance with another aspect of the present invention, a communicating method of a BS in a multihop relay wireless communication system is provided. The method includes determining whether dedicated resource allocation is necessary for an access link in which an RS and an MS communicate with each other, when the dedicated resource is necessary, determining a resource to be allocated to the RS, generating a dedicated access zone allocation message which comprises the determined dedicated resource information and transmitting the dedicated access zone allocation message to the RS.

In accordance with still another aspect of the present invention, an apparatus for an RS in a multihop relay wireless communication system is provided. The apparatus includes a controller for controlling a relay service between a Base Station (BS) and an MS and for determining whether a dedicated resource is necessary for the communications with the MS, a message generator for, when the dedicated resource is necessary, generating a dedicated access zone request message which comprises necessary bandwidth information and a transmitter for transmitting the dedicated access zone request message to the BS.

In accordance with yet another aspect of the present invention, an apparatus for a BS in a multihop relay wireless communication system is provided. The apparatus includes a controller for determining whether dedicated resource allocation is necessary for an access link in which an RS and an MS communicate with each other, and for determining a dedicated resource to be allocated to the RS when the dedicated resource is necessary, a message generator for generating a dedicated access zone allocation message which comprises the determined dedicated resource information and a transmitter for transmitting the dedicated access zone allocation message to the RS.

In accordance with still another aspect of the present invention, a communicating method of a BS in a multihop relay wireless communication system is provided. The method includes receiving a dedicated access zone request message from a RS, determining whether a dedicated access zone is allocable to the RS based on information of the dedicated access zone request message, transmitting a dedicated access zone allocation message including information of a dedicated resource allocated to the RS, to the RS when the dedicated access zone is allocable to the RS, and transmitting a dedicated access zone non-allocation message to the RS when the dedicated access zone is not allocable to the RS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a signaling method for allocating a dedicated resource to an access zone (or an access link) between a Relay Station (RS) and a Mobile Station (MS) when distributed scheduling is performed in a multihop relay broadband wireless communication system.

According to an exemplary implementation, the RS transmits to a Base Station (BS) bandwidth information required for dedicated communications with an MS in an access DownLink (DL) or UpLink (UL). The BS determines a dedicated zone to be used by the RS based on the bandwidth information and transmits the determined dedicated zone information to the RS and a neighbor RS. The RS provides a relay service to the MS by scheduling the dedicated zone, and the neighbor RS excludes the dedicated zone from its scheduling.

The multihop relay broadband wireless communication system is, for example, an Orthogonal Frequency Division Multiplexing (OFDM)/Orthogonal Frequency Division Multiple Access (OFDMA) communication system. Using the OFDM/OFDMA scheme, the multihop relay broadband wireless communication system can realize a high-speed data transmission by transmitting a physical-channel signal using a plurality of subcarriers and support mobility of the MS by means of a multi-cell structure.

While a Broadband Wireless Access (BWA) communication system is illustrated by way of example, the present invention is applicable to any cellular communication systems using a multihop relay scheme.

Figure 4:
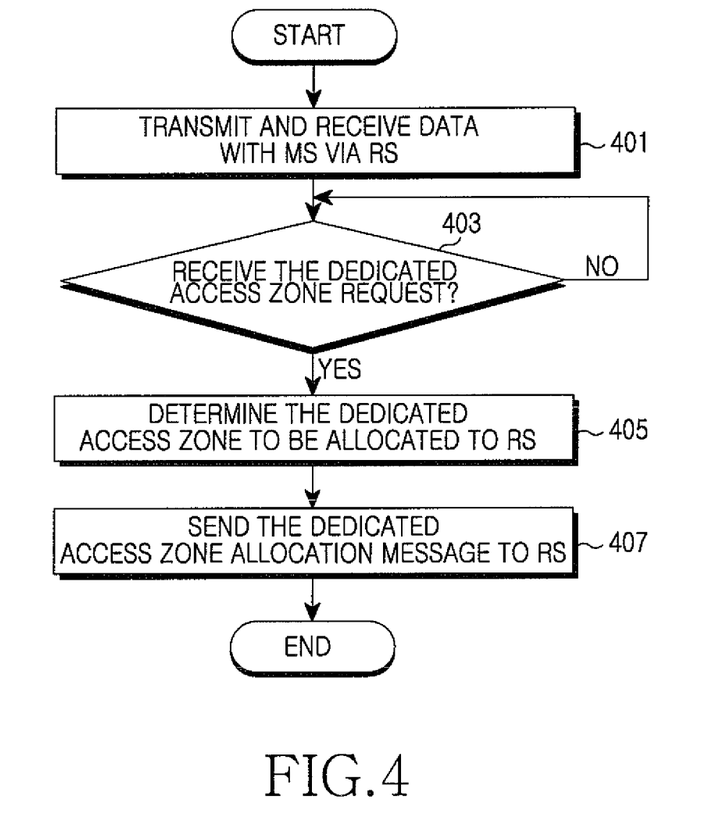
FIG. 4 illustrates operations of a BS in a multihop relay wireless communication system according to an exemplary embodiment of the present invention.

FIG. 4 illustrates operations of a BS in a multihop relay wireless communication system according to an exemplary embodiment of the present invention.

Referring to FIG. 4, in step 401, the BS transmits and receives data to and from an MS using a relay service of an RS. Using information received during communication with the MS using the relay service, the BS determines whether a dedicated access zone request message is received from the RS in step 403. The RS sends the dedicated access zone request message in order to communicate with the MS using a dedicated resource. An example of a dedicated access zone request message is shown in Table 1.

TABLE 1

| Syntax | Notes |
| --- | --- |
| RS Dedicated Access Zone Request{ | |
| HT | Indicate header Type |
| EC | Indicate encryption control |
| Type | Indicate Extended Media Access Control (MAC) Signaling Header Type II |
| Extended Type | Indicate RS dedicated access zone request header |
| DL/UL Indicator | Indicate the request is for DL access zone or UL access zone |
| BR | Number of OFDMA slots requested for the RS portion of DL(or UL) access zone |
| CID | Basic Connection IDentifier (CID) (or tunnel CID) of the RS |
| HCS | header check sequence |
| } | |

In Table 1, the dedicated access zone request message includes Header Type (HT), Encryption Control (EC), Type, Extended Type, DL/UL Indicator, Bandwidth Request (BR), RS CID, and Header Check Sequence (HCS). More specifically, the dedicated access zone request message includes the indicator indicating whether the requested dedicated access zone is UL or DL, the bandwidth information requested by the RS, and the RS CID information.

The structure of Table 1 can be used to request the dedicated zone for either the UL or the DL, but not for both the UL and the DL. Thus, another example of a dedicated access zone request message is shown in Table 2.

TABLE 2

| Syntax | Notes |
| --- | --- |
| RS Dedicated Access Zone Request{ | |
| HT | Indicate header Type |
| EC | Indicate encryption control |
| Type | Indicate Extended MAC Signaling Header Type II |
| Extended Type | Indicate RS dedicated access zone request header |
| DL Indicator | Indicate the request of DL access zone |
| DL BR | Number of OFDMA slots requested for the RS portion of DL access zone |
| UL Indicator | Indicate the request of UL access zone |
| UL BR | Number of OFDMA slots requested for the RS portion of UL access zone |
| CID | Basic CID (or tunnel CID) of the RS |
| HCS | header check sequence |
| } | |

In Table 2, the dedicated access zone request message includes a DL indicator indicating that the dedicated resource requested by the RS is DL, bandwidth information (DL BR) requested for the DL, a UL indicator indicating that the dedicated resource requested by the RS is UL, bandwidth information (UL BR) requested for the UL, and RS CID information. When the dedicated resource is requested for either the DL or the UL, the bandwidth for the link requiring no allocation can be set to '0'.

The dedicated access zone request message can employ an RS UL size request header defined in the present-day standard as shown in Table 3.

TABLE 3

| Syntax | Notes |
|---|---|
| RS UL size request header format( ){ | |
| HT | set to 1 |
| EC | set to 1 |
| Type | set to 1 |
| Extended Type | set to 5 indication RS UL size request header |
| size | Number of OFDMA slots requested for the RS portion of the UL access zone |
| CID | Basic CID of the RS |
| HCS | header check sequence |
| } | |

In Table 3, the dedicated access zone request message includes bandwidth information requested for the UL, and RS CID information. However, since the message of Table 3 can request the resource only for the UL, it is desirable to use the message of Table 1 or Table 2 to request the resource for the DL as well.

Tables 1, 2 and 3 are constituted using the extended type structure of the "Extended MAC Signaling Header Type II" of the Institute of Electrical and Electronics Engineers (IEEE) standard 802.16j. However, the dedicated access zone request message may be constituted as a general MAC management message, rather than as the header.

If the dedicated access zone request message is received from the RS, the BS determines a dedicated access zone to be allocated to the RS based on the bandwidth information of the received message in step 405. In step 407, the BS transmits a message including the allocation information of the determined dedicated access zone. The dedicated access zone allocation message can be broadcast so that neighbor RSs can also receive the message. An example of a dedicated access zone allocation message is shown in Table 4.

TABLE 4

| Syntax | Notes |
|---|---|
| RS Dedicated Access Zone Alloc{ | |
| Type | RS dedicated access zone allocation IE |
| Length | |
| RS CID | Basic CID of RS which request the allocation of dedicated access zone |
| DL/UL indicator | Indication the request is for DL access zone or UL access zone |
| OFDMA symbol offset | |
| Subchannel offset | |
| No. OFDMA symbols | |
| No. subchannels | |
| } | |

The dedicated access zone allocation message of Table 4 includes RS CID, a DL/UL indicator indicating whether the allocated dedicated access zone is UL or DL, and resource information relating to the allocated dedicated access zone (OFDMA symbol offset, Subchannel offset, No. OFDMA symbols, No. subchannels, and duration).

When the dedicated access zone request message received in step 403 is an RS UL size request header of Table 3, the BS can send an allocation message of Table 5 to the RS in response in step 407.

TABLE 5

| Syntax | Notes |
|---|---|
| RS Dedicated UL Access Zone Alloc{ | |
| Type | RS dedicated access zone allocation IE |
| Length | |
| RS CID | Basic CID of RS which request the allocation of dedicated access zone |
| OFDMA symbol offset | |
| Subchannel offset | |
| No. OFDMA symbols | |
| No. subchannels | |
| } | |

The dedicated access zone allocation message of Table 5 can include RS CID information, and resource information of the allocated dedicated access zone (OFDMA symbol offset, Subchannel offset, No. OFDMA symbols, No. subchannels, and duration).

The resource information of the dedicated access zone in the dedicated access zone allocation message of Table 4 and Table 5 can be represented using the start point of the access zone (OFDMA symbol offset) and the duration information of the allocated access zone, using the symbol start point (OFDMA symbol offset) of the access zone and the number of OFDMA symbols (No. OFDMA symbols), or using the OFDMA symbol start point of the access zone (OFDMA symbol offset), the subchannel start point (subchannel offset), the number of OFDMA symbols (No. OFDMA symbols), and the number of subchannels (No. subchannels).

The dedicated access zone allocation messages of Table 4 and Table 5 can further include time information which activates the use of the allocated dedicated zone. The BS can allocate the dedicated zone assigned through the dedicated access zone allocation message to the RS throughout a certain time period. In this case, the dedicated access zone allocation message can further include allocation duration information. The allocation duration information can signify how many frames the dedicated zone is allocated for by the frame. Alternatively, to allocate the dedicated access zone for a certain region, the BS can include an indicator indicative of allocation or deallocation into the dedicated access zone allocation message. In other words, after the dedicated access zone is assigned to the RS, the dedicated access zone can be deallocated by sending an allocation message including the deallocation indicator.

The dedicated access zone allocation messages of Table 4 and Table 5 can be transmitted in the form of a Relay zone (R)-Mobile Application Part (MAP) message sent from the BS to the RS, an RS-Channel Descriptor (CD) message sent to the RS, a broadcast message, or a multicast message.

Figure 5:
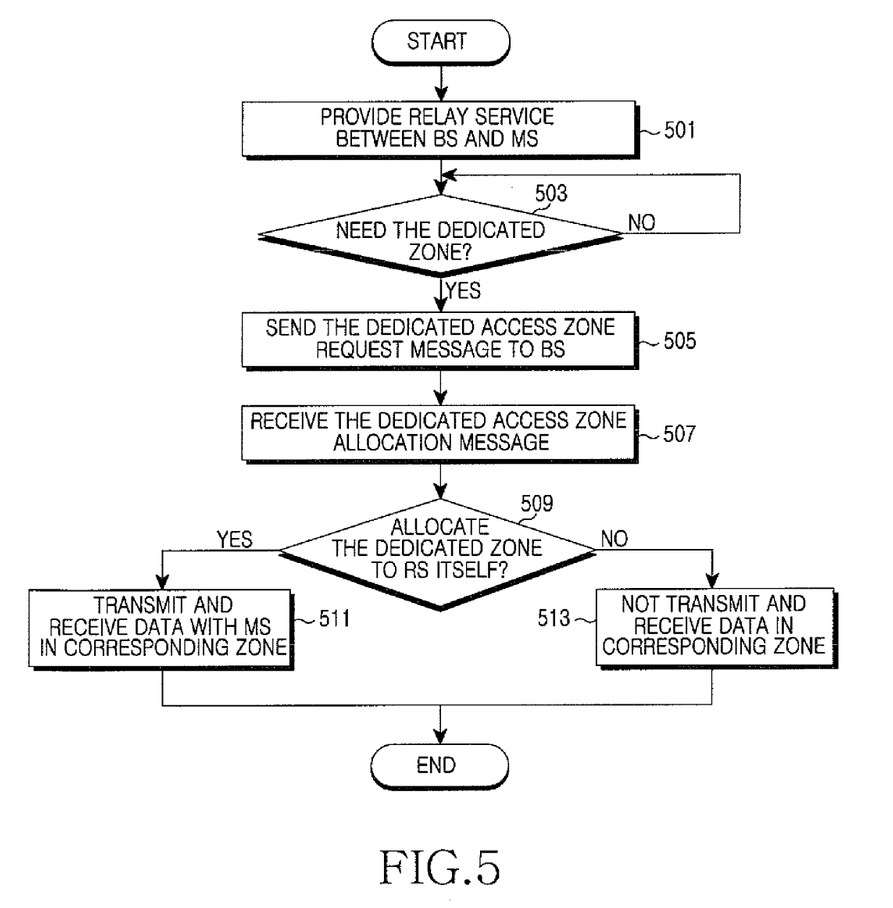
FIG. 5 illustrates operations of a Relay Station (RS) in a multihop relay wireless communication system according to an exemplary embodiment of the present invention.

FIG. 5 illustrates operations of an RS in a multihop relay wireless communication system according to an exemplary embodiment of the present invention.

Referring to FIG. 5, in step 501, the RS relays communications between the BS and the MS. While providing the relay service to the MS, the RS determines whether a dedicated access zone is necessary to provide the relay service to the MS in step 503. For instance, when interference from a neighbor RS exceeds a threshold and adversely affects the communications between the RS and the MS, the RS may determine the necessity of the dedicated zone. The interference threshold can be managed by the BS or the RS. The BS or the RS determines the degree of the interference by comparing a signal measurement value reported from the MS (e.g., Carrier to Interference and Noise Ratio (CINR), Signal to Interference and Noise Ratio (SINR), Received Signal Strength Indication (RSSI), interference level, etc.) with the threshold. When the interference exceeds a certain level, the dedicated access zone can be allocated.

If the RS determines that a dedicated access zone is necessary, the RS generates and transmits a dedicated access zone request message to the BS in step 505. The RS can send the message of Table 1, Table 2, or Table 3.

In step 507, the RS receives a dedicated access zone allocation message from the BS. The dedicated access zone allocation message can be constituted as shown in Table 4 or Table 5. Upon receiving the dedicated access zone allocation message, the RS analyzes the dedicated access zone allocation message and determines whether the allocation information of the received message designates itself in step 509. That is, the RS determines whether the RS CID set in the allocation message is its own CID.

When the RS CID of the allocation message is its own CID, the RS schedules resources for the dedicated access zone indicated by the allocation message and communicates with the MS over the dedicated access zone in step 511.

In contrast, when the RS CID of the allocation messages is not its own CID, the RS recognizes that the dedicated access zone indicated by the allocation message is allocated to another RS, and excludes the dedicated access zone from the scheduling in step 513. In doing so, the RS can broadcast a zone switch message (IE) informing of a new zone so that the MS can recognize the corresponding dedicated access zone.

In this exemplary embodiment of the present invention, the RS sends the dedicated access zone request message to the BS and the BS allocates the dedicated access zone by sending the dedicated access zone allocation message to the RS. However, even without the request of the RS, the BS can determine whether to allocate a dedicated access zone. In this case, when it is necessary to allocate a dedicated access zone, the BS can constitute and transmit the message of Table 4 or Table 5 to the RS. The necessity of the dedicated access zone allocation can be determined, for example, by using the interference on the MS in the communications with the RS. Otherwise, the dedicated access zone can be allocated for a user who pays an appropriate fee. Accordingly, the basis of the dedicated access zone allocation can vary.

So far, an exemplary scenario for allocating a dedicated access zone to an RS which requested the dedicated access zone allocation has been described with reference to FIGS. 4 and 5. Now, explanations provide a scenario for sending a dedicated access zone non-allocation message when it is impossible to allocate the dedicated access zone to the RS which requested the dedicated zone allocation by referring to FIGS. 6 and 7.

Figure 6:
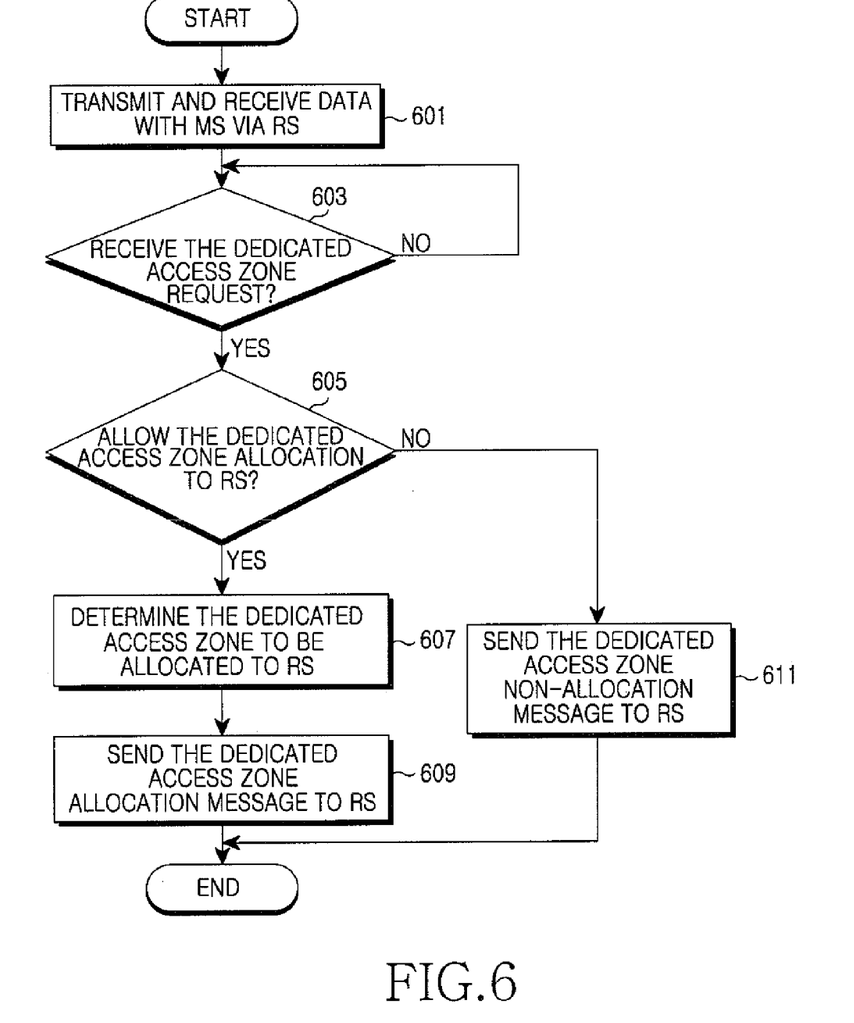
FIG. 6 illustrates operations of a BS in a multihop relay wireless communication system according to another exemplary embodiment of the present invention.

FIG. 6 illustrates operations of a BS in a multihop relay wireless communication system according to an exemplary embodiment of the present invention.

In step 601, the BS transmits and receives data to and from an MS through the relay service of the RS. Using information received during communication with the MS using the relay service, the BS determines whether a dedicated access zone request message is received from the RS in step 603. The dedicated access zone request message can be constituted as shown in Table 1, Table 2, or Table 3.

When receiving the dedicated access zone request message from the RS, the BS determines whether to allocate the dedicated access zone to the RS based on the bandwidth information of the received message in step 605. If the BS determines to allocate the dedicated access zone to the RS, the BS determines a dedicated access zone to be assigned to the RS in step 607 and sends a message including the allocation information of the determined dedicated access zone to the RS in step 609. The dedicated access zone allocation message can be broadcast so that neighbor RSs can also receive the message. The dedicated access zone allocation message can be constituted as shown in Table 4 or Table 5, and includes an indicator indicative of the dedicated access zone allocation and information relating to the zone allocated to the RS.

In contrast, if the BS determines not to allocate the dedicated access zone to the RS in step 605, the BS sends a message informing of non-allocation of the dedicated access zone to the RS in step 611. The dedicated access zone non-allocation message can utilize a separate message indicative of the non-allocation of the dedicated zone, or the format of Table 4 or Table 5 including an indicator indicative of the dedicated zone non-allocation. Herein, the indicator indicative of the dedicated zone non-allocation can be realized by setting the indicator of the dedicated access zone deallocation and the corresponding fields indicative of the dedicated access zone to '0' in Table 4 or Table 5.

Figure 7:
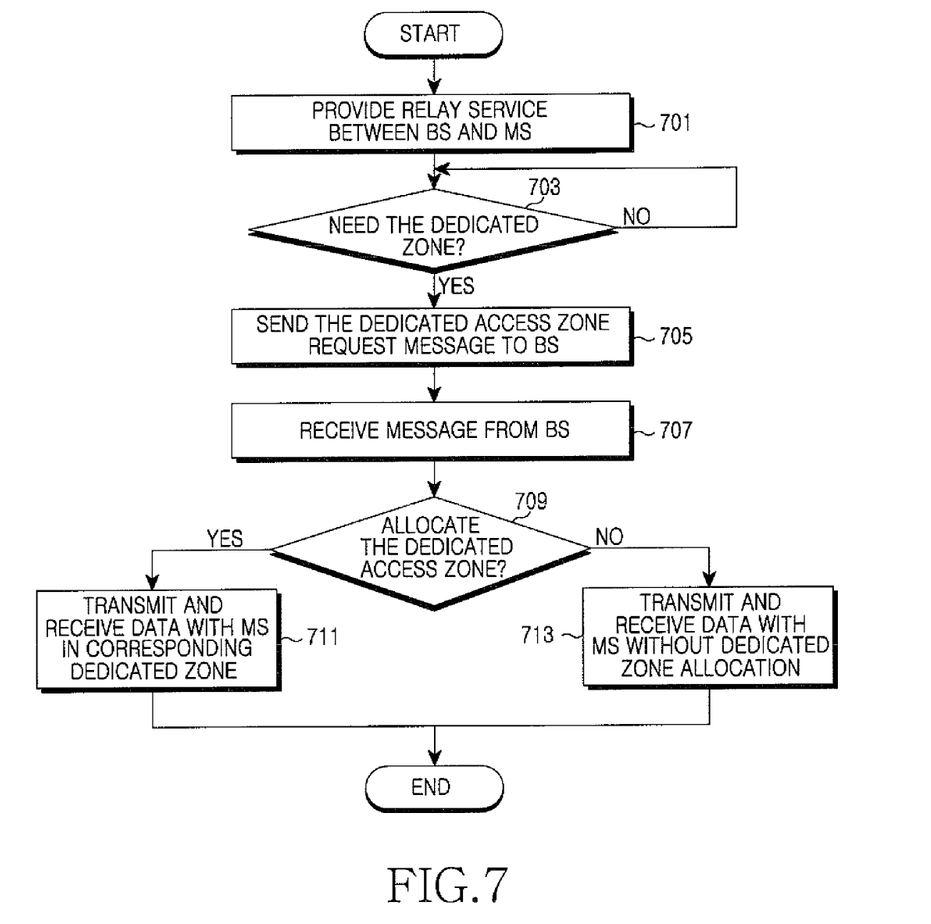
FIG. 7 illustrates operations of an RS in a multihop relay wireless communication system according to another exemplary embodiment of the present invention.

FIG. 7 illustrates operations of an RS in a multihop relay wireless communication system according to an exemplary embodiment of the present invention.

In step 701, the RS relays communications between the BS and the MS. In the relay service to the MS, the RS determines whether a dedicated access zone for the relay service to the MS is necessary in step 703. For example, when interference from a neighbor RS exceeds a threshold and adversely affects the communications between the RS and the MS, the RS may determine the necessity of the dedicated zone.

If the RS determines that a dedicated access zone is necessary, the RS generates and transmits a dedicated access zone request message to the BS in step 705. The RS can send the message of Table 1, Table 2, or Table 3.

In step 707, the RS receives a message from the BS in response to the dedicated access zone request message. In step 709, the RS analyzes the received message and determines whether the received message is a dedicated access zone allocation message. Herein, the dedicated access zone allocation message is constituted as shown in Table 4 or Table 5, and includes an indicator for the dedicated access zone allocation as well as the information of the allocated dedicated access zone. When receiving the dedicated access zone allocation message, the RS schedules resources for the dedicated access zone designated by the dedicated access zone allocation message and communicates with the MS over the dedicated access zone in step 711.

In contrast, when receiving a dedicated access zone non-allocation message, the RS communicates with the MS over a general access zone in step 713. The dedicated access zone non-allocation message can be a separate message indicative of the non-allocation of the dedicated access zone, or the message of Table 4 or Table 5 including the indicator of the dedicated zone non-allocation.

Figure 8:
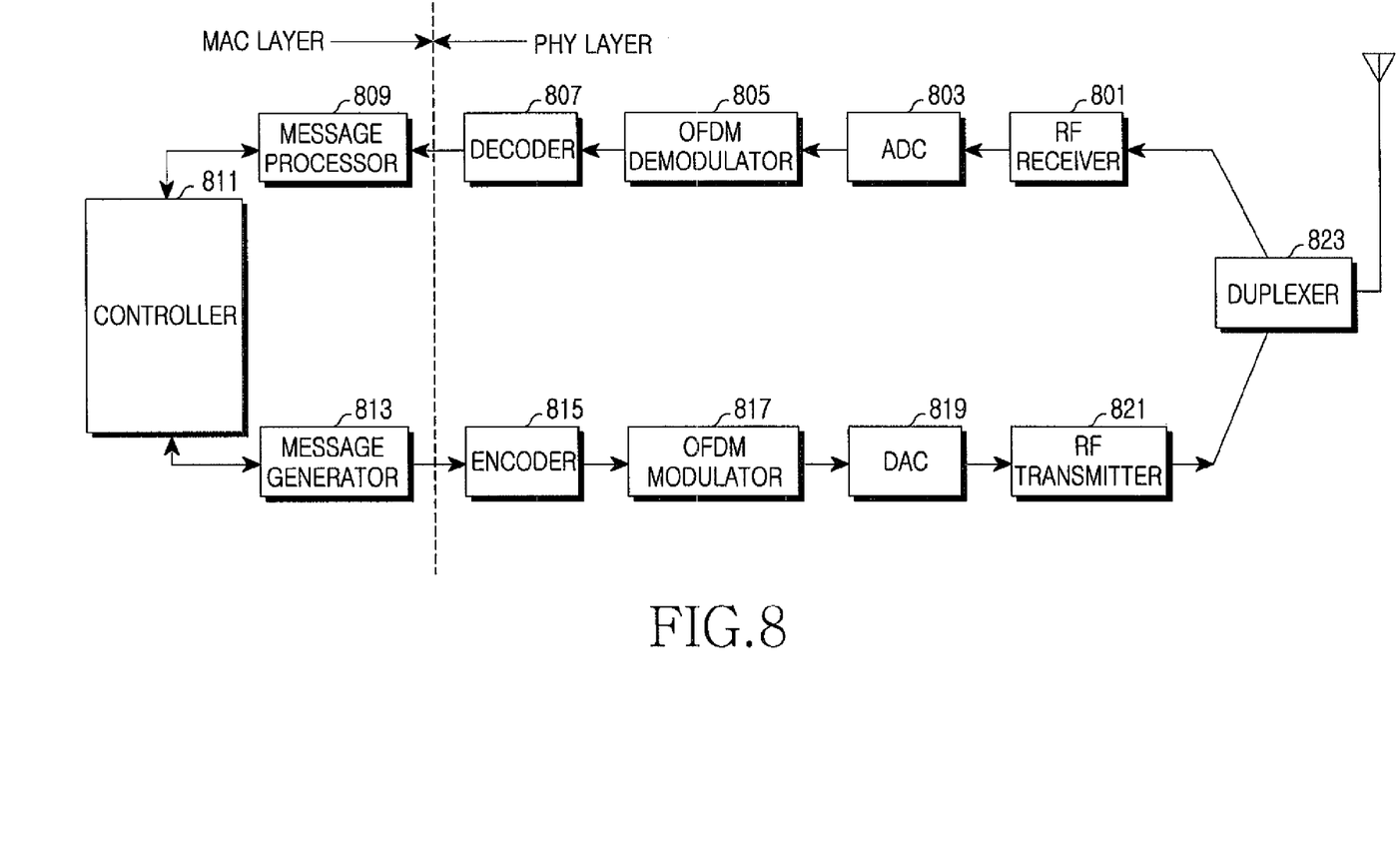
FIG. 8 illustrates a structure of a BS (or an RS) according to an exemplary embodiment of the present invention.

FIG. 8 is a block diagram of a BS (or an RS) according to an exemplary embodiment of the present invention.

Herein, since the BS and the RS each include substantially the same interface module (communication module) and have substantially the identical block structure, the operations of both the BS and the RS are described by referring to FIG. 8. While a Time Division Duplex (TDD)-OFDMA system is assumed, the present invention is also applicable to a Frequency Division Duplex (FDD)-OFDMA system, a hybrid system using both of the TDD and the FDD, cellular systems using other resource division schemes and the like.

The BS (or the RS) includes a Radio Frequency (RF) receiver 801, an Analog-to-Digital Converter (ADC) 803, an OFDM demodulator 805, a decoder 807, a message processor 809, a controller 811, a message generator 813, an encoder 815, an OFDM modulator 817, a Digital-to-Analog Converter (DAC) 819, an RF transmitter 821, and a duplexer 823.

The duplexer 823 transmits a transmit signal output from the RF transmitter 821 via an antenna and provides a signal received on the antenna to the RF receiver 801 according to a duplexing scheme. For example, according to the TDD scheme, the duplexer 823 transmits a signal output from the RF transmitter 821 via the antenna in a transmission interval and forwards a signal received on the antenna to the RF receiver 801 in a reception interval.

The RF receiver 801 converts the RF signal received on the antenna into a baseband analog signal and outputs the converted signal to the ADC 803. The ADC 803 converts the analog signal output from the RF receiver 801 into sample data and outputs the sample data to the OFDM demodulator 805. The OFDM demodulator 805 converts the sample data output from the ADC 803 into frequency-domain data through a Fast Fourier Transform (FFT) process, and selects and outputs data of subcarriers to be actually received from the frequency-domain data.

The decoder 807 demodulates and decodes the data output from the OFDM demodulator 805 at a preset modulation (Modulation and Coding Scheme (MCS)) level.

The message processor 809 decomposes a control message fed from the decoder 807 and provides the result to the controller 811. The controller 811 performs a corresponding process on information output from the message processor 809, and generates and provides information to transmit to the message generator 813. In an exemplary implementation, the controller 811 schedules resources. The message generator 813 composes a message with the various information provided from the controller 811 and outputs the message to the encoder 815 of the physical layer.

The encoder 815 encodes and modulates the data output from the message generator 813 at the preset modulation (MCS) level. The OFDM modulator 817 outputs sample data (OFDM symbols) by applying Inverse FFT (IFFT) to the data output from the encoder 815. The DAC 819 converts the sample data into an analog signal. The RF transmitter 821 converts the analog signal output from the DAC 819 into an RF signal and transmits the RF signal over the antenna.

The controller 811, as a protocol controller, controls the message processor 809 and the message generator 813. That is, although they are separately provided to distinguish their respective functions, the controller 811 can also function as the message processor 809 and the message generator 813. In the actual implementation, the controller 811 can process all or part of the message processor 809 and the message generator 813 functions.

The controller 811 receives necessary information from a corresponding component of the physical layer, or issues a control signal to a corresponding component of the physical layer in the course of the protocol processing.

Now, the operations of the BS and the RS are explained based on the structure of FIG. 8. The following descriptions focus on the signaling processing in the MAC layer.

First, the operations of the BS are illustrated.

The message processor 809 analyzes the dedicated access zone request message received from the RS and provides various information extracted from the dedicated access zone request message to the controller 811. Herein, the dedicated access zone request message can be, for example, the message of Table 1, Table 2, or Table 3.

The controller 811 determines whether it is possible to allocate a dedicated access zone to the RS using the information of the dedicated access zone request message provided from the message processor 809. When the dedicated access zone can be allocated to the RS, the BS determines a dedicated access zone to be assigned to the RS and provides information relating to the determined dedicated access zone to the message generator 813. In contrast, when it is infeasible to allocate the dedicated access zone, the controller 811 directs the message generator 813 to generate a dedicated access zone non-allocation message.

As such, the BS can allocate the dedicated access zone to the RS as requested by the RS. Alternatively, the BS can allocate the dedicated access zone to the RS according to its determination without the request of the RS. Furthermore, the BS can determine whether to allocate the dedicated access zone using the signal measurement value (e.g., CINR, SINR, RSSI, interference level, etc.) reported from the MS.

The message generator 813 generates the dedicate access zone allocation message or the dedicated access zone non-allocation message using the information provided from the controller 811 and forwards the generated message to the physical layer. Herein, the dedicated access zone allocation message can be, for example, the message of Table 4 or Table 5, and includes the indicator of the dedicated access zone allocation and the information of the allocated dedicated access zone. The dedicated access zone non-allocation message can be a separate message indicative of the non-allocation, or the message of Table 4 or Table 5 including the non-allocation indicator.

The message generated at the message generator 813 is processed into a transmittable form in the physical layer and then transmitted to the RS. In doing so, the dedicated access zone allocation message can be transmitted in the form of the R-MAP message, the RS-CD message, a broadcast message, or a multicast message.

Now, the operations of the RS are described.

The controller 811 determines whether the dedicated access zone is necessary for the relay service to the MS. For example, the controller 811 can determine the necessity of the dedicated access zone by evaluating the signal measurement value (e.g., CINR, SINR, RSSI, interference level, etc.) reported from the MS, or the user grade of the MS. Determining the necessity of the dedicated access zone, the controller 811 provides the information necessary for the generation of the dedicated access zone request message to the message generator 813.

The message generator 813 composes the dedicated access zone request message with the information provided from the controller 811 and forwards the message to the physical layer. Herein, the dedicated access zone request message can be, for example, the message of Table 1, Table 2, or Table 3. The message generated at the message generator 813 is processed into a transmittable form and then sent to the BS.

In response to the dedicated access zone request message, the dedicated access zone allocation message or the dedicated access zone non-allocation message can be received from the BS. According to the determination of the BS itself, the dedicated access zone allocation message may be received.

Upon receiving the dedicated access zone allocation message from the BS, the message processor 809 decomposes the dedicated access zone allocation message and provides various information extracted from the dedicated access zone allocation message to the controller 811. Herein, it is assumed that the dedicated access zone allocation message is a broadcast message or a multicast message which can be received at a plurality of RSs.

The controller 811 determines whether the dedicated access zone is allocated to the RS by analyzing the information fed from the message processor 809. When the dedicated access zone is assigned to the RS, the controller 811 schedules resources for the allocated dedicated access zone and provides the relay service to the corresponding MS over the dedicated access zone. In contrast, when the zone designated by the allocation message is assigned to another RS, the controller 811 excludes the dedicated access zone allocated to the other RS from its scheduling.

Meanwhile, upon receiving the dedicated access zone non-allocation message from the BS, the controller 811 schedules resources for an access zone other than the dedicated access zone and provides the relay service to the MS according to the result of the scheduling.

As set forth above, the dedicated access resource can be allocated to the RS which performs distributed scheduling, so as to communicate with the MS. Since the RS can communicate with the MS through the dedicated resource without the intervention of other nodes, the communication quality in relation with the MS can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a Relay Station (RS) in a wireless communication system, the method comprising:
    relaying communications between a Base Station (BS) and a Mobile Station (MS);
    determining whether a dedicated resource is necessary for the communications with the MS, based on channel conditions between the RS and the MS;
    generating a dedicated access zone request message requesting the BS to allocate a dedicated access zone to the RS, the dedicated access zone request message including bandwidth information;
    transmitting the dedicated access zone request message to the BS;
    receiving a dedicated access zone allocation message from the BS;
    determining whether a dedicated resource, designated by the allocation message, is allocated to the RS; and
    scheduling the dedicated resource based on the dedicated resource zone allocation message received from the BS,
    wherein the dedicated access zone comprises resources which the RS only uses for a dedicated communication between the RS and the MS, and wherein the determining of whether the dedicated resource is necessary comprises determining whether a Carrier to Interference plus Noise Ratio (CINR) of a channel between the RS and MS exceeds a threshold.

2. The method of claim 1, wherein the dedicated access zone request message comprises at least one of an indicator indicating that the requested dedicated resource is a downlink, information of a bandwidth requested for the downlink, an indicator indicating that the requested dedicated resource is an uplink, information of a bandwidth requested for the uplink, and an RS Connection IDentifier (CID).

3. The method of claim 1, wherein the determining of whether the dedicated resource is necessary comprises determining whether interference which affects the communications of the MS exceeds a threshold.

4. The method of claim 3, wherein the determining of whether the interference exceeds a threshold comprises comparing at least one of a Carrier to Interference and Noise Ratio (CINR), a Signal to Interference and Noise Ratio (SINR), a Received Signal Strength Indication (RSSI) and an interference level to the threshold.

5. The method of claim 1, further comprising:
    when the dedicated resource is allocated to another RS, excluding the dedicated resource from the scheduling.

6. The method of claim 1, wherein the dedicated access zone allocation message comprises at least one of an indicator indicating that the allocated dedicated resource is an uplink, information of the resource allocated for the uplink, an indicator indicating that the allocated dedicated resource is a downlink, information of the resource allocated for the downlink, start time information for activating the allocated dedicated resource, and information of a duration for which the allocated dedicated resource is effective.

7. The method of claim 6, wherein the dedicated access zone allocation message comprises one of a relay zone (R)-MAP message, an RS-Channel Descriptor (CD) message sent to the RS, a separate broadcast message, and a separate multicast message.

8. The method of claim 1, further comprising:
    after transmitting the dedicated access request message, analyzing a message received from the BS;
    when the received message comprises a dedicated access zone allocation message, providing a relay service to the MS over the dedicated access zone; and
    when the received message comprises a dedicated access zone non-allocation message, recognizing that allocation of the dedicated access zone is infeasible.

9. The method of claim 1, further comprising:
    scheduling the communications relayed between the BS and the MS.

10. A method of a Base Station (BS) in a wireless communication system, the method comprising:
    determining whether dedicated resource allocation is necessary for an access link in which a Relay Station (RS) and a Mobile Station (MS) communicate with each other, based on channel conditions between the RS and the MS;
    determining a resource to be allocated to the RS;
    generating a dedicated access zone allocation message which comprises the determined dedicated resource information; and
    transmitting the dedicated access zone allocation message to the RS,
    wherein the dedicated resource, which are allocated to the RS, are scheduled by the RS,
    wherein the dedicated access zone comprises resources which the RS only uses for a dedicated communication between the RS and the MS, and wherein the determining of whether the dedicated resource is necessary comprises determining whether a Carrier to Interference plus Noise Ratio (CINR) of a channel between the RS and MS exceeds a threshold.

11. The method of claim 10, wherein the dedicated access zone allocation message comprises at least one of an indicator indicating that the allocated dedicated resource is an uplink, information of the resource allocated for the uplink, an indicator indicating that the allocated dedicated resource is a downlink, information of the resource allocated for the downlink, start time information for activating the allocated dedicated resource, and information of a duration for which the allocated dedicated resource is effective.

12. The method of claim 10, wherein the determining of whether the dedicated resource is necessary comprises determining whether interference which affects the communications of the MS exceeds a threshold.

13. The method of claim 12, wherein the determining of whether the interference exceeds a threshold comprises comparing at least one of a Carrier to Interference and Noise Ratio (CINR), a Signal to Interference and Noise Ratio (SINR), a Received Signal Strength Indication (RSSI) and an interference level to the threshold.

14. The method of claim 10, further comprising:
receiving a dedicated access zone request message which requests the dedicated resource, from the RS.

15. The method of claim 14, further comprising:
when it is infeasible to allocate the dedicated access zone to the RS, transmitting a dedicated access zone non-allocation message to the RS.

16. The method of claim 14, wherein the dedicated access zone request message comprises at least one of an indicator indicating that the requested dedicated resource is a downlink, information of a bandwidth requested for the downlink, an indicator indicating that the requested dedicated resource is an uplink, information of a bandwidth requested for the uplink, and an RS Connection IDentifier (CID).

17. The method of claim 16, wherein the dedicated access zone allocation message comprises one of a relay zone (R)-MAP message, an RS-Channel Descriptor (CD) message sent to the RS, a separate broadcast message, and a separate multicast message.

18. An apparatus for a Relay Station (RS) in a wireless communication system, the apparatus comprising:
a controller for controlling a relay service between a Base Station (BS) and a Mobile Station (MS) and for determining, based on channel conditions between the RS and the MS, whether a dedicated resource is necessary for the communications with the MS;
a message generator for generating a dedicated access zone request message requesting the BS to allocate a dedicated access zone to the RS, the dedicated access zone request message including bandwidth information;
a transmitter for transmitting the dedicated access zone request message to the BS; and
a receiver for receiving a dedicated access zone allocation message from the BS,
wherein the controller determines whether a dedicated resource designated by the allocation message is allocated to the RS, and schedules the dedicated resource based on the dedicated resource zone allocation message received from the BS, and
wherein the dedicated access zone comprises resources which the RS only uses for a dedicated communication between the RS and the MS, and wherein the controller determines whether the dedicated resource is necessary according to whether a Carrier to Interference plus Noise Ratio (CINR) of a channel between the RS and MS exceeds a threshold.

19. The apparatus of claim 18, wherein the dedicated access zone request message comprises at least one of an indicator indicating that the requested dedicated resource is a downlink, information of a bandwidth requested for the downlink, an indicator indicating that the requested dedicated resource is an uplink, information of a bandwidth requested for the uplink, and an RS Connection IDentifier (CID).

20. The apparatus of claim 18, wherein the dedicated access zone allocation message comprises at least one of an indicator indicating that the allocated dedicated resource is an uplink, information of the resource allocated for the uplink, an indicator indicating that the allocated dedicated resource is a downlink, information of the resource allocated for the downlink, start time information for activating the allocated dedicated resource, and information of a duration for which the allocated dedicated resource is effective.

21. The apparatus of claim 18, wherein the controller excludes the dedicated resource from the scheduling when the dedicated resource is allocated to another RS.

22. The apparatus of claim 18, further comprising:
a message processor for, after transmitting the dedicated access request message, analyzing a message received from the BS,
wherein, when the received message comprises a dedicated access zone non-allocation message, the controller recognizes that the allocation of the dedicated access zone is infeasible.

23. An apparatus for a Base Station (BS) in a wireless communication system, the apparatus comprising:
a controller for determining whether dedicated resource allocation is necessary for an access link in which a Relay Station (RS) and a Mobile Station (MS) communicate with each other based on channel conditions between the RS and the MS, and for determining a dedicated resource to be allocated to the RS;
a message generator for generating a dedicated access zone allocation message which comprises the determined dedicated resource information; and
a transmitter for transmitting the dedicated access zone allocation message to the RS,
wherein the dedicated resource, which are allocated to the RS, are scheduled by the RS,
wherein the dedicated access zone comprises resources which the RS only uses for a dedicated communication between the RS and the MS, and wherein the dedicated resource allocation is determined to be necessary when a Carrier to Interference plus Noise Ratio (CINR) of a channel between the RS and MS exceeds a threshold.

24. The apparatus of claim 23, further comprising:
a receiver for receiving a dedicated access zone allocation message, which requests the dedicated resource, from the RS.

25. The apparatus of claim 24, wherein the message generator, when the dedicated access zone is not allocated to the RS, generates a dedicated access zone non-allocation message.

26. The apparatus of claim 24, wherein the dedicated access zone request message comprises at least one of an indicator indicating that the requested dedicated resource is a downlink, information of a bandwidth requested for the downlink, an indicator indicating that the requested dedicated resource is an uplink, information of a bandwidth requested for the uplink, and an RS Connection IDentifier (CID).

27. The apparatus of claim 23, wherein the dedicated access zone allocation message comprises at least one of an indicator indicating that the allocated dedicated resource is an uplink, information of the resource allocated for the uplink, an indicator indicating that the allocated dedicated resource is a downlink, information of the resource allocated for a downlink, start time information for activating the allocated dedicated resource, and information of a duration for which the allocated dedicated resource is effective.

* * * * *